United States Patent
Nakamura et al.

(10) Patent No.: US 9,873,106 B2
(45) Date of Patent: Jan. 23, 2018

(54) HYDROPHILIC MEMBER, METHOD FOR MANUFACTURING SAME AND HYDROPHILIC MEMBER MAINTENANCE METHOD

(71) Applicant: MURAKAMI CORPORATION, Shizuoka (JP)

(72) Inventors: Masatoshi Nakamura, Fujieda (JP); Momoko Takinami, Yaizu (JP); Tomoaki Takinami, Yaizu (JP); Masaaki Matsuura, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 15/313,200

(22) PCT Filed: Apr. 17, 2015

(86) PCT No.: PCT/JP2015/061787
§ 371 (c)(1),
(2) Date: Nov. 22, 2016

(87) PCT Pub. No.: WO2015/182276
PCT Pub. Date: Dec. 3, 2015

(65) Prior Publication Data
US 2017/0182479 A1    Jun. 29, 2017

(30) Foreign Application Priority Data
May 30, 2014 (JP) .................................. 2014-113348

(51) Int. Cl.
*B01J 21/06* (2006.01)
*B01J 35/00* (2006.01)
(Continued)

(52) U.S. Cl.
CPC ............. *B01J 21/063* (2013.01); *B01J 21/12* (2013.01); *B01J 35/004* (2013.01);
(Continued)

(58) Field of Classification Search
CPC ....................................................... B01J 21/063
See application file for complete search history.

(56) References Cited

U.S. PATENT DOCUMENTS 5,854,708 A      12/1998  Komatsu et al.
6,908,698 B2 *    6/2005  Yoshida ............ B32B 17/10018
                                                    428/409
(Continued)

FOREIGN PATENT DOCUMENTS

JP       2901550 B2    6/1999
JP       2001-130928 A 5/2001
(Continued)

OTHER PUBLICATIONS

International Search Report issued with respect to Application No. PCT/JP2015/061787, dated Jun. 23, 2015.
(Continued)

*Primary Examiner* — Melvin C Mayes
*Assistant Examiner* — Stefanie Cohen
(74) *Attorney, Agent, or Firm* — Greenblum & Bernstein, P.L.C.

(57) ABSTRACT

A hydrophilic member that enables provision of favorable photocatalytic performance while enhancing water repellent agent resistance and a method for manufacturing the same are provided. A maintenance method for removing a water repellent agent adhering to a surface of a hydrophilic layer of a hydrophilic member, the water repellent agent having a cation property, is provided. A photocatalytic layer is formed on a base material. An intermediate layer is formed on the photocatalytic layer. A hydrophilic layer having an isoelec- (Continued)

tric point exceeding 7 is formed on the intermediate layer. The intermediate layer is a layer that causes the hydrophilic layer to be formed so as to have a low density compared to a case where the hydrophilic layer is formed directly on the photocatalytic layer under the same film forming condition. A water repellent agent adhering to a surface of the hydrophilic layer can effectively be removed using sodium bicarbonate.

12 Claims, 9 Drawing Sheets

(51) Int. Cl.
    *B01J 21/12*     (2006.01)
    *B01J 35/02*     (2006.01)
    *B32B 9/00*     (2006.01)
    *C03C 17/34*     (2006.01)

(52) U.S. Cl.
    CPC ........... *B01J 35/0006* (2013.01); *B01J 35/02* (2013.01); *B32B 9/005* (2013.01); *C03C 17/3417* (2013.01); *C03C 2217/71* (2013.01); *C03C 2217/75* (2013.01)

(56) References Cited

U.S. PATENT DOCUMENTS

2003/0186089 A1\* 10/2003 Kikuchi ................ B01J 35/004
    428/701
2006/0118408 A1     6/2006 Myli et al.
2006/0121315 A1     6/2006 Myli et al.

FOREIGN PATENT DOCUMENTS

JP     2003-038963 A     2/2003
JP     2003-287601 A     10/2003
WO     2006060597 A2     6/2006

OTHER PUBLICATIONS

International Preliminary Report on Patentability issued with respect to Application No. PCT/JP2015/061787, dated Dec. 6, 2016.
Japanese Office Action issued with respect to Patent Application No. 2014-113348, dated Aug. 16, 2017.

\* cited by examiner

VAPOR DEPOSITION CONDITIONS

| | | SUBSTRATE TEMPERATURE | OXYGEN GAS PRESSURE | VAPOR DEPOSITION RATE | FILM THICKNESS |
|---|---|---|---|---|---|
| PHOTOCATALYTIC LAYER | TiO2 | 300°C | $2.5 \times 10^{-2}$ Pa | 2.0 Å/sec | 200nm |
| HYDROPHILIC LAYER | SiO2 | 50°C | $2.0 \times 10^{-2}$ Pa | 1.5 Å/sec | 20nm |
| | Al2O3 | 50°C | $2.0 \times 10^{-2}$ Pa | 0.6 Å/sec | 7nm |
| | NiO | 50°C | $4.0 \times 10^{-2}$ Pa | 2.6 Å/sec | 6nm |

VAPOR DEPOSITION CONDITIONS

| | | SUBSTRATE TEMPERATURE | OXYGEN GAS PRESSURE | VAPOR DEPOSITION RATE | PROPER FILM THICKNESS |
|---|---|---|---|---|---|
| PHOTOCATALYTIC LAYER | TiO2 | 300°C | $2.5 \times 10^{-2}$ Pa | 2.0 Å/sec | 70–400nm (140–230nm) |
| INTERMEDIATE LAYER | SiO2 | 50°C | $2.0 \times 10^{-2}$ Pa | 1.5 Å/sec | 5–15nm |
| HYDROPHILIC LAYER | Al2O3 | 50°C | $2.0 \times 10^{-2}$ Pa | 0.6 Å/sec | 5–13nm |

HYDROPHILIC MEMBER, METHOD FOR MANUFACTURING SAME AND HYDROPHILIC MEMBER MAINTENANCE METHOD

The disclosure of Japanese Patent Application No. JP2014-113348 filed on May 30, 2014 including the specification, drawings, claims and abstract is incorporated herein by reference in its entirety.

TECHNICAL FIELD

This invention relates to an improvement of a hydrophilic member including a hydrophilic layer stacked on a photocatalytic layer, the hydrophilic member enabling provision of favorable photocatalytic performance (performance of decomposition and removal of organic dirt adhering to a surface of the hydrophilic layer by means of a photocatalytic action) while enhancing water repellent agent resistance. This invention also relates to a method for manufacturing the hydrophilic member. This invention further relates to a maintenance method for removing a water repellent agent adhering to a surface of a hydrophilic layer of the hydrophilic member, the water repellent agent having a cation property.

BACKGROUND ART

As a hydrophilic member including a hydrophilic layer stacked on a photocatalytic layer, there is one described in Patent Literature 1 indicated below. This is one obtained by forming a photocatalytic layer on a surface of a base material and forming a hydrophilic layer on the photocatalytic layer as an outermost layer. This enables provision of hydrophilicity by the outermost hydrophilic layer and also, even if the hydrophilicity temporarily lowered by adherence of organic dirt to a surface of the hydrophilic layer, enables the hydrophilicity of the hydrophilic layer to be recovered by decomposition and removal of the adhering organic dirt by means of a photocatalytic action of the underlying photocatalytic layer.

CITATION LIST

Patent Literature

Patent Literature 1: Japanese Patent No. 2901550

SUMMARY OF INVENTION

Technical Problem

The hydrophilic member described in Patent Literature 1 has been in production as a hydrophilic mirror for a vehicle outer mirror. The photocatalytic layer of the hydrophilic mirror is formed of $TiO_2$ (titanium oxide) and the hydrophilic layer of the hydrophilic mirror is formed of $SiO_2$ (silicon oxide). It has been found that this hydrophilic mirror has a problem in resistance to water-repellent car wash that has rapidly been spread in recent years. In other words, a water repellent agent contained in a water-repellent car wash agent used in water-repellent car wash contains a silicone resin as a main component, and thus, if the water repellent agent adheres to a surface of a mirror, the water repellent agent cannot be removed by means of a photocatalytic action. Thus, accumulation of the water repellent agent on the surface of the mirror due to repeated water-repellent car wash results in failure to recover hydrophilicity.

Therefore, the present inventors conducted a study to enhance a resistance of a hydrophilic member to water-repellent car wash. According to tests conducted by the present inventors, it has been found that: ease of adhesion (chemical binding) of a water repellent agent to a surface of a hydrophilic layer varies depending on the isoelectric point (a ph value of a medium such as water at which a surface potential of a relevant material in the medium is zero) of the material forming the hydrophilic layer; and a water repellent agent easily adheres to a hydrophilic layer formed of a material having a low isoelectric point and less easily adheres to a hydrophilic layer formed of a material having a high isoelectric point. Presumably, this is because the water repellent agent contained in the water-repellent car wash agent is prepared so as to have a cation property in order to tightly bind to a negatively-charged vehicle body. In other words, in hydrophilic mirrors for vehicle outer mirrors that have conventionally been in production, presumably, a water repellent agent having a cation property easily adheres to the hydrophilic layer because the isoelectric point of $SiO_2$ forming the hydrophilic layer is 1 to 2.8 and thus is low. Therefore, the present inventors formed a hydrophilic layer using a hydrophilic material having a high isoelectric point instead of $SiO_2$ and found that a water repellent agent less easily adheres to the hydrophilic layer. On the other hand, however, the present inventors have also found that a decomposition and removal action of a photocatalyst is significantly impaired. Details of these points will be described later.

This invention provides a hydrophilic member that solves the aforementioned problems and enables provision of favorable photocatalytic performance while enhancing water repellent agent resistance. This invention also provides a method for manufacturing the hydrophilic member. This invention further provides a maintenance method for removing a water repellent agent having a cation property, the water repellent agent adhering to a surface of a hydrophilic layer of the hydrophilic member.

Solution to Problem

A hydrophilic member according to this invention is a hydrophilic member including a photocatalytic layer disposed on a base material and a hydrophilic layer disposed on the photocatalytic layer, wherein: an isoelectric point of the hydrophilic layer has a value exceeding 7; and a layer that causes the hydrophilic layer to be formed so as to have a low density compared to a case where the hydrophilic layer is formed directly on the photocatalytic layer under the same film forming condition, is disposed as an intermediate layer between the photocatalytic layer and the hydrophilic layer. According to this hydrophilic member, the isoelectric point of the hydrophilic layer has a value exceeding 7, and thus, a water repellent agent having a cation property less easily adheres to a surface of the hydrophilic layer, enabling enhancement in water repellent agent resistance. Also, the layer that causes the hydrophilic layer to be formed so as to have a low density compared to a case where the hydrophilic layer is formed directly on the photocatalytic layer under the same film forming condition is disposed as the intermediate layer between the photocatalytic layer and the hydrophilic layer, and thus, even using a hydrophilic material that is less easily formed into a layer having a low density if the hydrophilic material is formed directly on a photocatalytic layer, the hydrophilic layer can be formed so as to have a low density. As a result of the hydrophilic layer being formed so as to have a low density, a photocatalytic action more easily reaches the surface of the hydrophilic layer, enabling provision of favorable photocatalytic performance. The hydrophilic layer can include, for example, an inorganic oxide material having an isoelectric point exceeding 7.

In the hydrophilic member according to this invention, for example, it is possible that the intermediate layer consists essentially of $SiO_2$. According to this hydrophilic member, the hydrophilic layer can easily be formed so as to have a low density. Consequently, a hydrophilic member that enables provision of favorable photocatalytic performance while enhancing water repellent agent resistance can easily be provided. A film thickness of the intermediate layer largely affects photocatalytic performance against organic dirt. In other words, if the intermediate layer is excessively thin, an action of the intermediate layer to form the hydrophilic layer so as to have a low density deteriorates, and thus, a photocatalytic action less easily reaches the surface of the hydrophilic layer. Also, if the intermediate layer is excessively thick, a distance between the photocatalytic layer and the hydrophilic layer is long, and thus, a photocatalytic action less easily reaches the surface of the hydrophilic layer. Therefore, it is preferable that the film thickness of the intermediate layer be set to a film thickness that enables a favorable photocatalytic action to be caused on the surface of the hydrophilic layer. If the intermediate layer consists essentially of $SiO_2$, a film thickness of the intermediate layer is set to, for example, 5 to 15 nm, enabling provision of favorable photocatalytic performance on the surface of the hydrophilic layer.

In the hydrophilic member according to this invention, for example, it is possible that the hydrophilic layer consists essentially of $Al_2O_3$ (aluminum oxide). Since $Al_2O_3$ has an isoelectric point of 7.4 to 9.2, which is high, and thus, less easily causes a water repellent agent having a cation property to adhere thereto and in addition, has relatively-favorable hydrophilicity and very high scratch resistance and water insolubility. On the other hand, $Al_2O_3$ less easily has a low density when a layer of $Al_2O_3$ is formed directly on a photocatalytic layer and thus, less easily provides favorable photocatalytic performance. However, a layer of $Al_2O_3$ is formed after the intermediate layer according to this invention is formed on the photocatalytic layer, whereby the layer of $Al_2O_3$ can easily be formed so as to have a low density. Consequently, favorable photocatalytic performance can be provided. The film thickness of the hydrophilic layer affects a photocatalytic action against organic dirt. In other words, if the hydrophilic layer is excessively thick, the distance between the photocatalytic layer and the surface of the hydrophilic layer is long, and thus, a photocatalytic action less easily reaches the surface of the hydrophilic layer. Also, where an isoelectric point of the intermediate layer is low, if the intermediate layer is partially exposed in the surface of the hydrophilic member because of the hydrophilic layer being excessively thin, a water repellent agent having a cation property easily adheres to the surface, resulting in decrease in water repellent agent resistance. Therefore, it is preferable that the film thickness of the hydrophilic layer be set to a thickness that is small such that a favorable photocatalytic action on the surface of the hydrophilic layer can be obtained and, if the isoelectric point of the intermediate layer is low, is not excessively small such that the intermediate layer is not so much exposed. If the hydrophilic layer consists essentially of $Al_2O_3$ and the isoelectric point of the intermediate layer is low, a film thickness of the hydrophilic layer is set to, for example, 5 to 13 nm, enabling provision of favorable water repellent agent resistance and favorable photocatalytic performance on the surface of the hydrophilic layer.

In the hydrophilic member according to this invention, for example, it is possible that the photocatalytic layer consists essentially of $TiO_2$. According to this hydrophilic member, favorable photocatalytic performance can be provided.

A hydrophilic member manufacturing method according to this invention is a hydrophilic member manufacturing method including: forming a photocatalytic layer on a base material; forming an intermediate layer on the photocatalytic layer; and forming a hydrophilic layer having an isoelectric point exceeding 7 on the intermediate layer, wherein the intermediate layer is a layer that causes the hydrophilic layer to be formed so as to have a low density compared to a case where the hydrophilic layer is formed directly on the photocatalytic layer under the same film forming condition. According to this method, a hydrophilic member that enables provision of favorable photocatalytic performance while enhancing water repellent agent resistance can be manufactured.

In the hydrophilic member manufacturing method according to this invention, it is possible that where each of the photocatalytic layer, the intermediate layer and the hydrophilic layer is formed using a physical vapor deposition method (PVD method), and a temperature of the base material in the film forming is set to be a sufficiently-low temperature when the hydrophilic layer is formed (or when the intermediate layer and the hydrophilic layer are formed) compared to the temperature when the photocatalytic layer is formed. According to this method, even using a hydrophilic material that is less easily formed into a layer having a low density, the hydrophilic layer can be formed so as to have a low density.

A hydrophilic member maintenance method according to this invention includes performing water repellent agent removal treatment of a surface of the hydrophilic layer of a hydrophilic member according to this invention, hydrophilicity of the surface being lowered by adherence of a water repellent agent, using sodium bicarbonate ($NaHCO_3$: sodium hydrogen carbonate) to recover the hydrophilicity of the surface of the hydrophilic layer. According to this method, sodium bicarbonate produces hydrogen carbonate ions ($HCO_3^-$) as a result of being dissolved in water, the hydrogen carbonate ions chemically adsorb the water repellent agent having a cation property, the water repellent agent adhering to the surface of the hydrophilic layer of the hydrophilic member and thereby effectively take the water repellent agent off from the surface of the hydrophilic layer, enabling recovery of the hydrophilicity of the surface of the hydrophilic layer. The water repellent agent removal treatment can effectively be performed by, for example, rubbing the surface of the hydrophilic layer with a sponge of, e.g., polyurethane with sodium bicarbonate and water absorbed therein. In this case, if the surface of the hydrophilic layer is rubbed in a state in which sodium bicarbonate powder remains, an effect of physically removing the water repellent agent by means of polishing can also be expected. In this case, since a Mohs hardness of sodium bicarbonate is 2.5, which is low, if a hardness of hydrophilic layer has is high to a certain extent (for example, a Mohs hardness of $Al_2O_3$ is 9, which is very high), the hydrophilic layer is much less likely to be damaged by the rubbing.

DESCRIPTION OF EMBODIMENT

<<Test Using Reference Example>>

Figure 2:
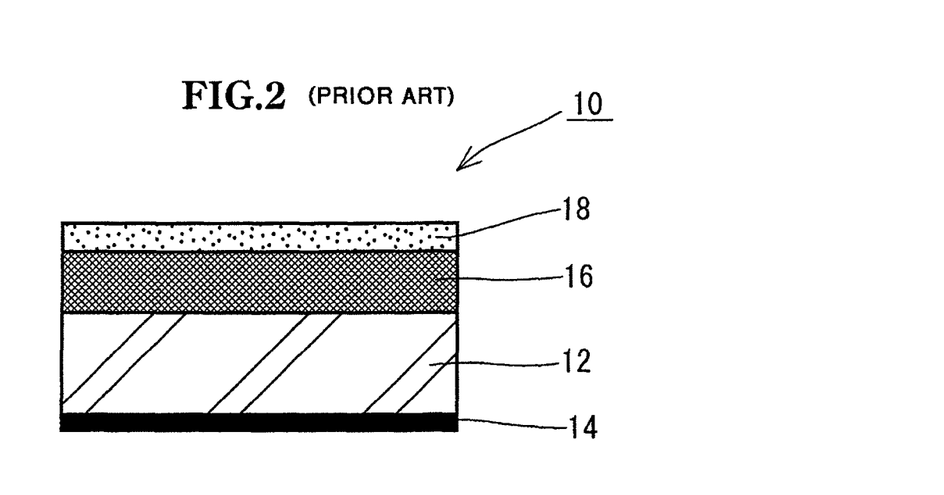
FIG. 2 is a schematic cross-sectional view illustrating a hydrophilic member having a conventional structure as a reference example.
Figure 3:
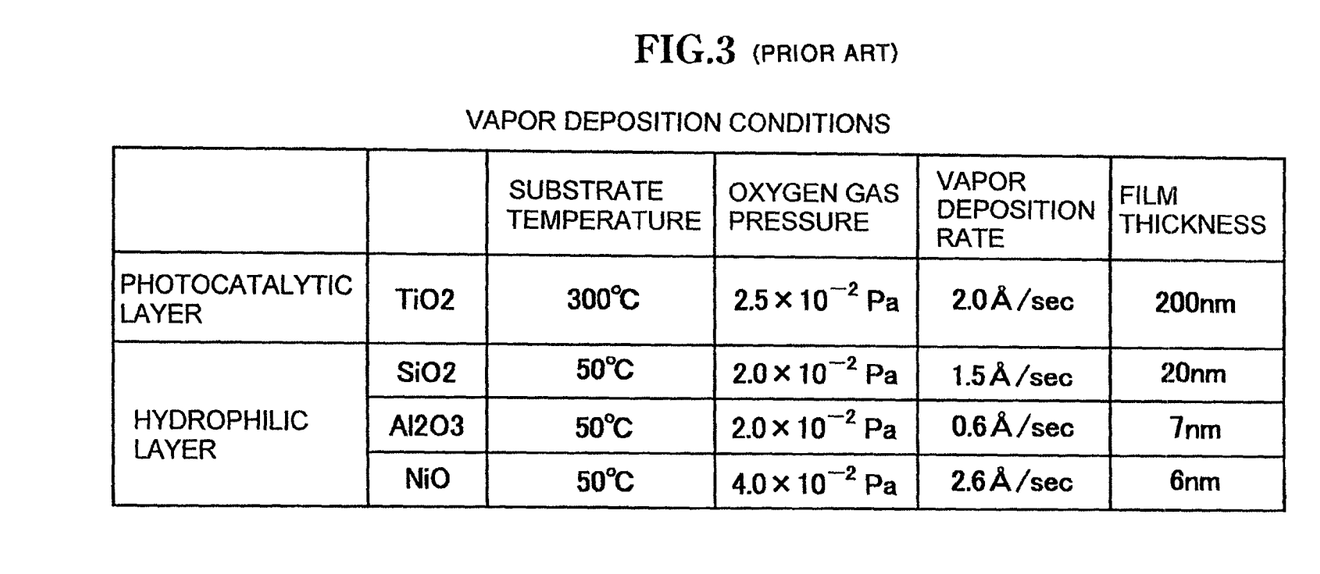
FIG. 3 is a table indicating vapor deposition conditions used for forming each layer in the reference example.

Before description of an embodiment of this invention, a test conducted on
(a) ease of water repellent agent adherence,
(b) photocatalytic performance, and
(c) sustainability of hydrophilicity in a dark place, for different materials for a hydrophilic layer will be described. Here, as a reference example, a test was conducted using a hydrophilic member 10 having a conventional structure illustrated in FIG. 2. The hydrophilic member 10 is a hydrophilic mirror and is configured as follows. A reflective layer 14 of, e.g., Cr (chrome) is formed on a back surface (surface on the side opposite to the side on which a point of viewing a mirror is disposed) of a base material (substrate) 12 formed of a soda glass plate. A photocatalytic layer 16 formed of $TIO_2$ is formed on a surface of the base material 12. A hydrophilic layer 18 is formed directly on a surface of the photocatalytic layer 16. Three types of samples of the hydrophilic member 10 according to the reference example each having a hydrophilic layer 18 of $SiO_2$, $Al_2O_3$ or NiO (nickel oxide), which is a hydrophilic material, were fabricated and used in respective tests. The photocatalytic layer 16 and the three types of hydrophilic layers 18 were each formed under the vapor deposition conditions indicated in FIG. 3, using a vacuum vapor deposition method.

(a) Test on Ease of Water Repellent Agent Adherence

Figure 4:
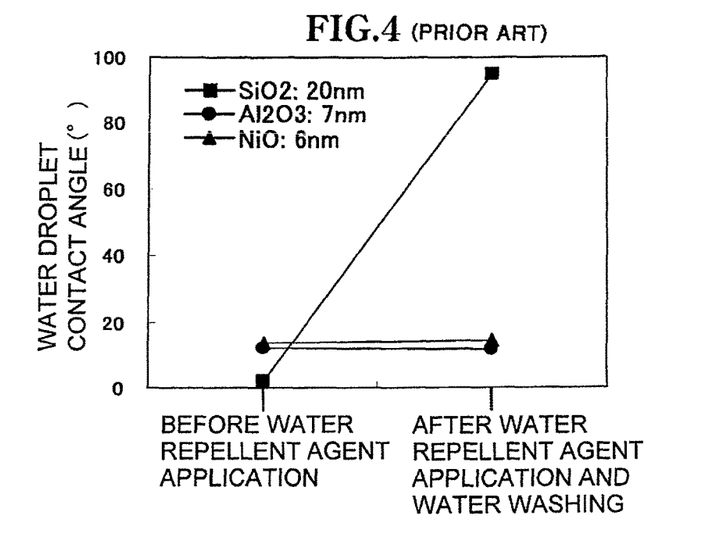
FIG. 4 is a graph indicating results of a comparison test of ease of water repellent agent adhesion for different materials for a hydrophilic layer, the comparison test being conducted using hydrophilic member according to the reference example.

A test on ease of water repellent agent adherence was conducted using the three types of samples of the hydrophilic member 10. In this test, each sample was immersed in a water repellent liquid obtained by 25-fold dilution of a water repellent agent ("FK-2 Coating" manufactured by Beauty Co. Ltd.) with tap water, and removed from the liquid and then immediately washed with water, and a contact angle of a water droplet on a surface of the hydrophilic layer 18 was measured. FIG. 4 indicates results of the measurement. According to the results, the three types of samples had hydrophilicity before application of the water repellent agent. In other words, the hydrophilicity before application of the water repellent agent is highest if the hydrophilic layer 18 is formed of $SiO_2$. If the hydrophilic layer 18 is formed of $Al_2O_3$ or NiO, hydrophilicity that is somewhat poorer than that of the case where the hydrophilic layer 18 is formed of $SiO_2$ but is still sufficient was obtained. However, after the water repellent agent application and water washing, while the samples whose hydrophilic layers 18 are formed of $Al_2O_3$ and NiO, respectively, kept the hydrophilicity, the sample whose hydrophilic layer 18 is form of $SiO_2$ completely lost the hydrophilicity. Such difference is presumed to be attributable to a difference in isoelectric point of a hydrophilic material forming the hydrophilic layer 18 of the respective samples. In other words, the isoelectric points of the hydrophilic materials forming the hydrophilic layers 18 of the respective samples are as follows:

$SiO_2$: 1 to 2.8
$Al_2O_3$: 7.4 to 9.2
NiO: 10.3.

On the other hand, a water repellent agent included in a water-repellent car wash agent is prepared so as to have a cation property so that the water repellent agent strongly binds to a negatively-charged vehicle body. $SiO_2$ which forms a hydrophilic layer in a conventionally-commercialized hydrophilic mirror for a vehicle outer mirror has a low isoelectric point, and a surface of the hydrophilic layer releases H+ upon being in contact with water, and is negatively charged, and thus, a water repellent agent having a cation property easily chemically binds to the surface. On the other hand, $Al_2O_3$ and NiO each have a high isoelectric point, and the surface of the hydrophilic layer releases $OH^-$ upon being in contact with water and is positively charged, and thus a water repellent agent having a cation property less easily chemically binds to the surface. It can be presumed that the results in FIG. 4 were thus obtained.

Consequently, if the hydrophilic layer 18 is formed of a hydrophilic material having a low isoelectric point such as $SiO_2$, the water repellent agent resistance is low, and if the hydrophilic layer 18 is formed of a hydrophilic material having a high isoelectric point such as $Al_2O_3$ or NiO, the water repellent agent resistance is high. In practical use for, e.g., a hydrophilic mirror for a vehicle outer mirror, it is conceivable that sufficient water repellent agent resistance can be obtained if the isoelectric point of the hydrophilic layer exceeds 7.

(b) Test on Photocatalytic Performance

Figure 5:
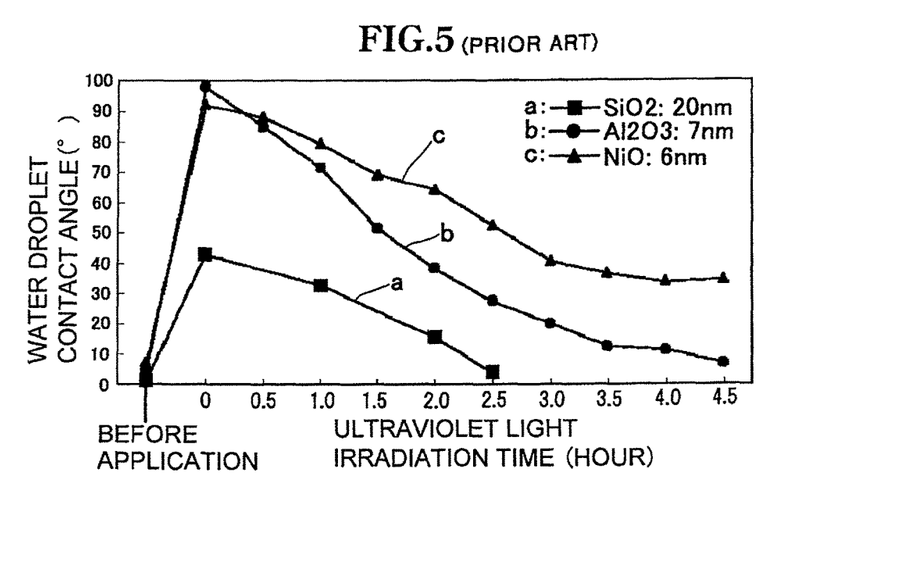
FIG. 5 is a graph indicating results of a comparison test of photocatalytic performance for different materials for a hydrophilic layer, the comparison test being conducted using the hydrophilic member according to the reference example.

A test on photocatalytic performance against organic dirt was conducted using samples of the three types of the hydrophilic member 10. In this test, gear oil was dropped as organic dirt on a surface of the hydrophilic layer 18 of each sample and the hydrophilic layer 18 was left for one hour and then washed with water and dried naturally. Next, the surface of the hydrophilic layer 18 of each sample was continuously irradiated with ultraviolet light having an intensity of 1.0 mW/cm$^2$ using a black light, and during the irradiation, a contact angle of a water droplet on the surface of the hydrophilic layer 18 was measured every 0.5 hours. FIG. 5 indicates results of the measurement. According to the results, in each of the three types of samples, the water droplet contact angle decreases with passage of ultraviolet light irradiation time, and thus, it can be seen that a photocatalytic action was obtained. However, upon irradiation of the sample whose hydrophilic layer 18 is formed of $SiO_2$ (characteristic line a) with the ultraviolet light, the water droplet contact angle successfully decreases to 10 degrees or less. On the other hand, upon irradiation of the sample whose hydrophilic layer 18 is formed of $Al_2O_3$ (characteristic line b) with the ultraviolet light, the water droplet contact angle successfully decreases at first but the decrease becomes slower as the water droplet contact angle decreases. Also, upon irradiation of the sample whose hydrophilic layer 18 is formed of NiO (characteristic line c) with the ultraviolet light, the water droplet contact angle successfully decreases at first, but the decrease becomes slower as the water droplet contact angle decreases. Therefore, the photocatalytic performance is highest in the case where the hydrophilic layer 18 is formed of $SiO_2$, and is lower where the hydrophilic layer 18 is formed of $Al_2O_3$, and is even lower where the hydrophilic layer 18 is formed of NiO. One of factors of this can be considered to be that $SiO_2$ is easily formed into a low density film (rough film such as a porous film) while $Al_2O_3$ and NiO are easily formed into a high density film (dense film) compared to $SiO_2$. In other words, it is conceivable that a hydrophilic layer 18 formed so as to have a low density allows a photocatalytic action of a photocatalytic layer 16 to more easily reach a surface of the hydrophilic layer 18, enabling provision of favorable photocatalytic performance.

(c) Test on Sustainability of Hydrophilicity in Dark Place

Figure 6:
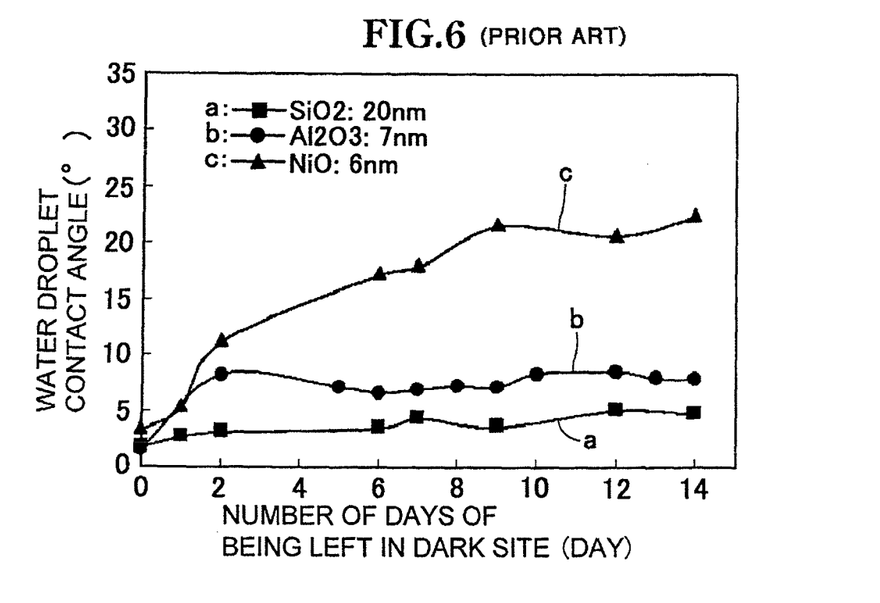
FIG. 6 is a graph indicating results of a comparison test of sustain ability of hydrophilicity in a dark place for different materials for a hydrophilic layer, the comparison test being conducted using the hydrophilic member according to the reference example.

A test on sustainability of hydrophilicity in a dark place was conducted using samples of the three types of the hydrophilic member 10. In this test, each sample with hydrophilicity sustained (with almost no adherence of a water repellent agent and organic substances) was left in an environment of a dark place (ultraviolet light intensity of 0 mW/cm$^2$), and during that time, a contact angle of a water droplet on a surface of the hydrophilic layer 18 was measured on a daily basis. FIG. 6 indicates results of the measurement. According to the results, sustainability of the hydrophilicity in the dark place is highest in the sample whose hydrophilic layer 18 is formed of $SiO_2$ (that is, a speed of increase in water droplet contact angle is slowest), and then $Al_2O_3$ and NiO in descending order of sustainability of the hydrophilicity in the dark place. However, the sample whose hydrophilic layer 18 is formed of $Al_2O_3$ or NiO also has a certain degree of sustainability of hydrophilicity in a dark place, and thus may be used as a practical hydrophilic member if the sample can provide favorable photocatalytic performance.

<<Embodiment>>

Figure 1:
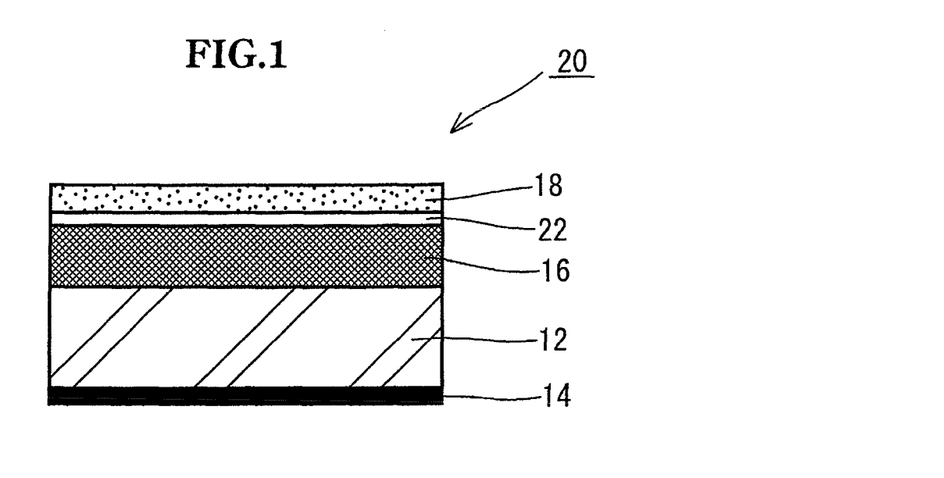
FIG. 1 is a schematic cross-sectional view illustrating an embodiment of a hydrophilic member according to this invention.

FIG. 1 illustrates an embodiment of a hydrophilic member according to this invention. The hydrophilic member 20 is one configured as a hydrophilic mirror for a vehicle outer mirror. For parts that are in common with the above-described reference example in FIG. 2, reference numerals that are the same as those of the reference example are used. The hydrophilic member 20 is configured as follows. A reflective layer 14 of, e.g., Cr is formed on a back surface of a base material (substrate) 12 formed of a soda glass plate. On a front surface of the base material 12, photocatalytic layer 16 formed of $TiO_2$ is formed directly or via a barrier layer (not illustrated). The barrier layer is a layer for preventing decrease in photocatalytic performance due to diffusion or sodium contained in the soda glass forming the base material 12 into the photocatalytic layer 16, and is formed of, e.g., $SiO_2$. An intermediate layer 22 is formed directly on a surface of the photocatalytic layer 16. A hydrophilic layer 18 is formed as an outermost layer directly on a surface of the intermediate layer 22. A surface of the hydrophilic layer 18 is exposed to an external environment.

An isoelectric point of the hydrophilic layer 18 has a value exceeding 7. Such hydrophilic layer 18 can be configured by forming the hydrophilic layer 18 using an inorganic oxide material having an isoelectric point exceeding 7, for example, $Al_2O_3$. The intermediate layer 22 is a layer that causes the hydrophilic layer 18 to be formed so as to have a low density (rough film) (that is, facilitates forming of the hydrophilic layer 18 so as to have a low density) compared to a case where the hydrophilic layer 18 is formed directly on the photocatalytic layer 16 where these hydrophilic layers 18 are formed under same film forming conditions. The intermediate layer 22 is essentially formed of a material that is different of those of the photocatalytic layer 16 and the hydrophilic layer 18, and can be formed of $SiO_2$ of a low density, for example. In other words, $Al_2O_3$ is likely to be formed into a dense film in nature, but can be formed into a low-density film by forming the film on a $SiO_2$ film that is likely to be an amorphous film and is more likely to have a low density compared to $Al_2O_3$. As described above, as a result of $Al_2O_3$ being formed into a low density film as the hydrophilic layer 18 with the aid of the underlying intermediate layer 22, photocatalytic performance can be enhanced compared to the case where the hydrophilic layer 18 is formed directly on the photocatalytic layer 16, while ensuring water repellent agent resistance (difficulty in water repellent agent adherence) that is an essential property of $Al_2O_3$.

<<Example>>

Figure 7:
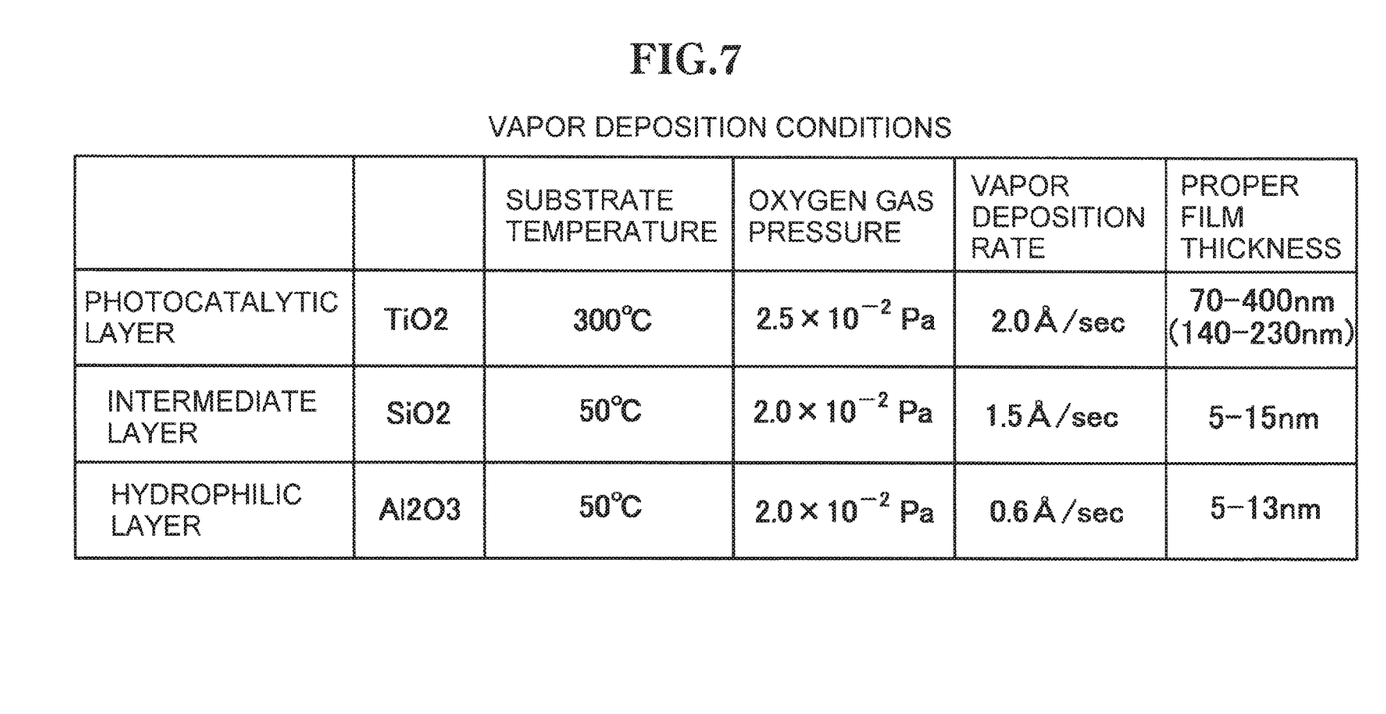
FIG. 7 is a table indicating vapor deposition conditions used for film forming of each layer in an example of this invention.

An example of the hydrophilic member 20 in FIG. 1 will be described. Here, a hydrophilic member 20 was configured by forming a film of $TiO_2$ as a photocatalytic layer 16 directly on a front surface of a base material 12 formed of a soda glass plate, forming a film of $SiO_2$ as an intermediate layer 22 directly on a surface of the photocatalytic layer 16 and forming a film of $Al_2O_3$ as a hydrophilic layer 18 directly on a surface of the intermediate layer 22. Each of the photocatalytic layer 16, the intermediate layer 22 and the hydrophilic layer 18 was formed under vapor deposition conditions indicated in FIG. 7, using a vacuum vapor deposition method. $TiO_2$ which forms the photocatalytic layer 16 may have an anatase crystal structure or a rutile crystal structure; however, $TiO_2$ having an anatase crystal structure is preferable as a crystal structure forming the photocatalytic layer 16 because of high photocatalytic activity. However, each of a rutile crystal structure and a composite crystal structure of an anatase crystal structure and a rutile crystal structure may be used as a crystal structure of the photocatalytic layer 16. A film thickness of the photocatalytic layer 16 having an anatase crystal structure is preferably no less than 70 nm and no more than 400 nm. In other words, if the film thickness is less than 70 nm, no sufficient photocatalytic performance can be provided, and if the film thickness exceeds 400 nm, no enhancement in photocatalytic performance can be observed because ultraviolet light absorption is saturated. A film thickness of $TiO_2$ can be more preferably set to no less than 140 nm and no more than 230 nm. In other words, film thickness in this range enables provision of high photocatalytic performance and minimization of light interference action (phenomenon in which an interference color produced by a thin film varies depending on an angle of viewing a front surface of the hydrophilic member 20). A proper film thickness of $SiO_2$ forming the intermediate layer 22 and a proper film thickness of $Al_2O_3$ forming the hydrophilic layer 18 will be described later.

Figure 8:
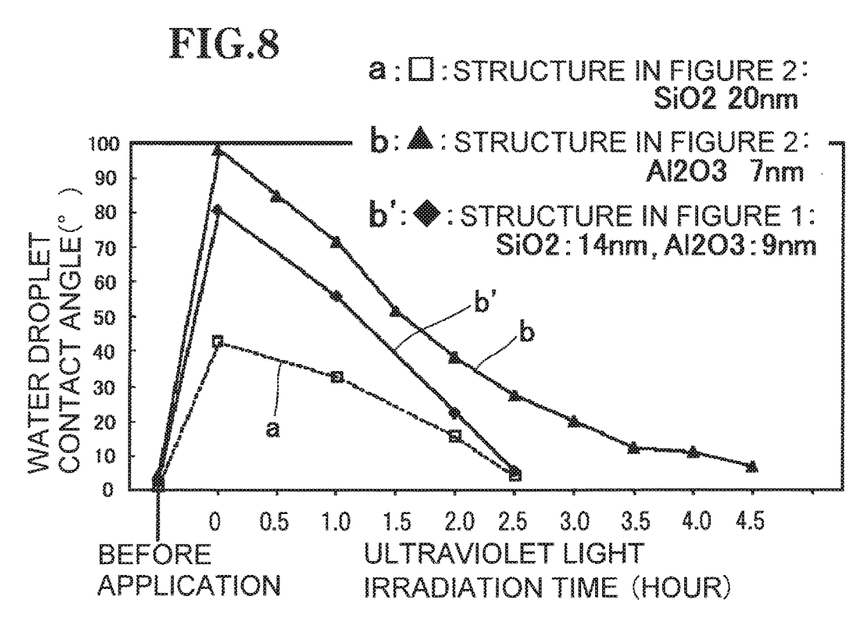
FIG. 8 is a graph indicating results of comparison tests of photocatalytic performance that varies depending on provision or non-provision of an intermediate layer, using hydrophilic members according to the example and the reference example.

A test of photocatalytic performance against organic dirt was conducted using a sample of the hydrophilic member 20 according to the example. This test was conducted under a procedure and conditions that were the same as those of the test of photocatalytic performance against organic dirt for the hydrophilic member 10 according to the reference example in FIG. 5. In other words, gear oil was dropped as organic dirt on a surface of the hydrophilic layer 18 in the sample of the hydrophilic member 20, and the hydrophilic layer 18 was left for one hour and then washed with water and dried naturally. Next, the surface of the hydrophilic layer 18 of the sample was continuously irradiated with ultraviolet light having an intensity of 1.0 mW/cm² using a black light, and during the irradiation, a contact angle of a water droplet on the surface of the hydrophilic layer 18 was measured every 0.5 hours. FIG. 8 indicates a result of the measurement by characteristic line b'. In FIG. 8, characteristic line a indicates characteristic line a in FIG. 5 (photocatalytic performance of the hydrophilic member 10 in FIG. 2 in which the hydrophilic layer 18 of $SiO_2$ is formed directly on the photocatalytic layer 16 of $TiO_2$), and characteristic line b indicates characteristic line b in FIG. 5 (photocatalytic performance of the hydrophilic member 10 FIG. 2 in which the hydrophilic layer 18 of $Al_2O_3$ is formed directly on the photocatalytic layer 16 of $TiO_2$). Comparing characteristic lines b and b', in the hydrophilic member 10 in FIG. 2 and the hydrophilic member 20 in FIG. 1, although the respective hydrophilic layers 18 of $Al_2O_3$ are ones formed under same film forming conditions, the hydrophilic member 20 in FIG. 1 having the intermediate layer 22 of $SiO_2$ exhibits quick hydrophilicity recovery (that is, water droplet contact angle successfully decreases to 10 degrees or less) compared to the hydrophilic member 10 in FIG. 2 having no intermediate layer, and thus, substantial enhancement in photocatalytic performance can be seen. In other words, the water droplet contact angle (characteristic line b') of the hydrophilic member 20 in FIG. 1 successfully decreases upon irradiation of the hydrophilic member 20 with ultraviolet light, and the water droplet contact angle reaches 10 degrees or less in an ultraviolet light irradiation time period that is substantially the same as that in the case of the hydrophilic member 10 in FIG. 2 having the hydrophilic layer 18 of $SiO_2$ (characteristic line a).

Figure 9:
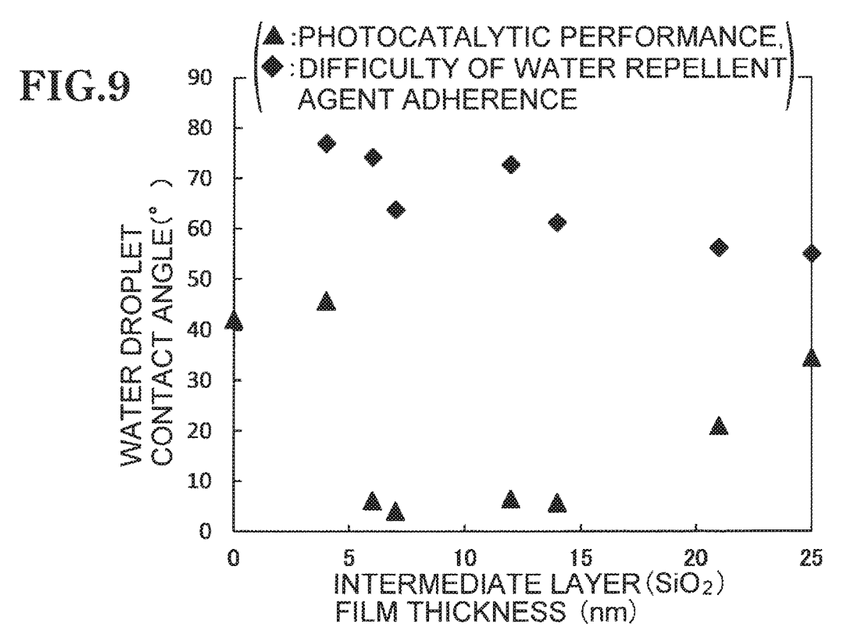
FIG. 9 is a graph indicating results of a test of variation in ease of water repellent agent adherence and photocatalytic performance depending on a film thickness of an intermediate layer when a film thickness of a hydrophilic layer is fixed in the hydrophilic member according to the example.

A proper film thickness of $SiO_2$ forming the intermediate layer 22 of the hydrophilic member 20 according to the example will be described. Here, a plurality of samples with a film thickness of $Al_2O_3$ forming the hydrophilic layer 18 fixed to 10 nm and a film thickness of $SiO_2$ forming the intermediate layer 22 set to various thicknesses were fabricated, and tests of photocatalytic performance against organic dirt and water repellent agent resistance (difficulty of water repellent agent adherence) was conducted for each sample. In the test of photocatalytic performance against organic dirt, gear oil was dropped as organic dirt on a surface of the hydrophilic layer 18 of each sample, and the hydrophilic layer 18 was left for one hour and then washed with water and dried naturally. Next, the surface of the hydrophilic layer 18 of each sample was continuously irradiated with ultraviolet light having an intensity of 1.0 mW/cm² using a black light, and a contact angle of a water droplet on the surface of the hydrophilic layer 18 were measured three hours later. In the test of water repellent agent resistance, each sample was immersed in a water repellent liquid obtained by 25-fold dilution of a water repellent agent ("ENEOS D Water Repellent Coat"+"ENEOS D Protection Coat" manufactured by JX Nippon Oil & Energy Trading Corporation) with tap water. After five minutes from removal of each sample from the water repellent liquid, each sample was washed with water and a contact angle of a water droplet, on the surface of the hydrophilic layer 18 was measured. FIG. 9 indicates results of both tests. According to the results, the water repellent agent resistance does not rapidly change depending on the film thickness of the intermediate layer 22. On the other hand, the photocatalytic performance against organic dirt largely changes depending on the film thickness of the intermediate layer 22. In other words, if the film thickness of the intermediate layer 22 is less than 5 nm, the effect of forming the hydrophilic layer 18 on the intermediate layer 22 so as to have a low density deteriorates, and thus a photocatalytic action of the photocatalytic layer 16 less easily reaches the surface of the hydrophilic layer 18. Also, if the film thickness of the intermediate layer 22 is more than 15 nm, also, a photocatalytic action of the photocatalytic layer 16 less easily reaches the surface of the hydrophilic layer 18 because a distance between the photocatalytic layer 16 and the hydrophilic layer 18 is long. According to FIG. 9, it can be seen that the film thickness of the intermediate layer 22 of $SiO_2$ is preferably set to 5 to 15 nm so that a favorable photocatalytic action of the photocatalytic layer 16 is provided to the surface of the hydrophilic layer 18.

Figure 10:
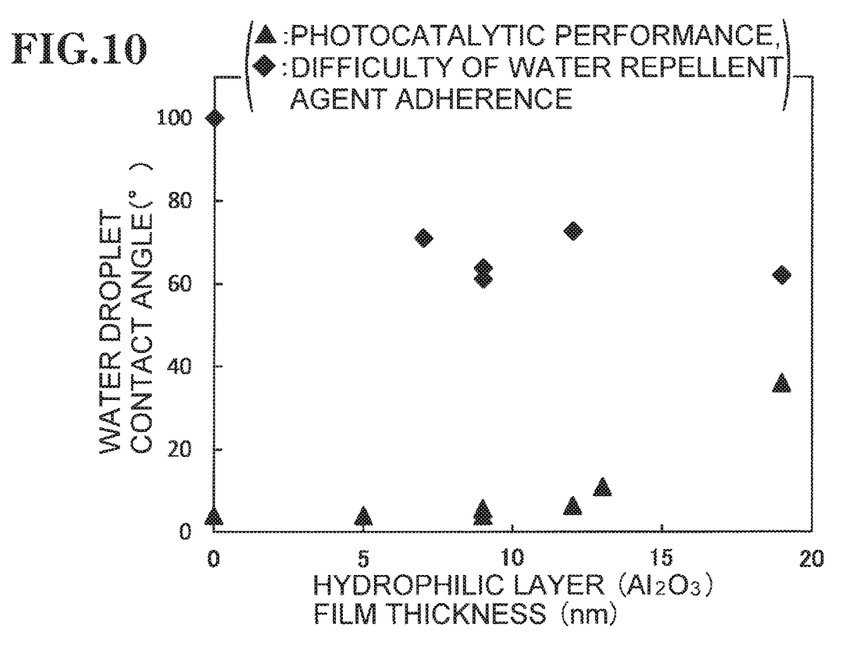
FIG. 10 is a graph indicating results of a test of variation in ease of water repellent agent adherence and photocatalytic performance depending on a film thickness of a hydrophilic layer when a film thickness of an intermediate layer is fixed in the hydrophilic member according to the example.

Next, a proper film thickness of $Al_2O_3$ forming the hydrophilic layer 18 in the hydrophilic member 20 according to the example will be described. Here, a plurality of samples with a film thickness of $SiO_2$ forming the intermediate layer 22 fixed as 10 nm and a film thickness of $Al_2O_3$ forming the hydrophilic layer 18 set to various thicknesses were fabricated, and tests photocatalytic performance against organic dirt and water repellent agent resistance (difficulty of water repellent agent adherence) were conducted for each sample. Methods of both tests are the same as those of the above-described tests for a proper film thickness of $SiO_2$ forming the intermediate layer 22 (tests providing the test results in FIG. 9) FIG. 10 indicates results of the tests. According to the results, the water repellent agent resistance rapidly decreases if the film thickness of the hydrophilic layer 18 is less than approximately 5 nm. Presumably, this is because if the film thickness of the hydrophilic layer 18 is less than approximately 5 nm, $SiO_2$ forming the intermediate layer 22 is partially exposed to the front surface of the hydrophilic member 20, which facilitates adherence (chemical binding) of a water repellent agent. Also, the photocatalytic performance against organic dirt largely changes depending on the film thickness of the hydrophilic layer 18. In other words, if the film thickness of the hydrophilic layer 18 is more than 13 nm, a photocatalytic action of the photocatalytic layer 16 less easily reaches the surface of the hydrophilic layer 18 because a distance between the photocatalytic layer 16 and the surface of the hydrophilic layer 18 is long. According to FIG. 10, it can be seen that the film thickness of the hydrophilic layer 18 is preferably set to 5 to 13 nm so that $SiO_2$ forming the intermediate layer 22 is not largely exposed to the surface of the hydrophilic member 20 and a favorable photocatalytic action of the photocatalytic layer 16 can be provided to the surface of the hydrophilic layer 18.

Next, a method for maintenance of a hydrophilic member according to this invention will be described. A hydrophilic member according to this invention intrinsically less allows a water repellent agent having a cation property to adhere to a surface of a hydrophilic layer, but still may have decreased hydrophilicity due to adherence (remaining) of a water repellent agent as a result of repetition of, e.g. water repellent car wash. In such a case, maintenance is necessary to effectively remove the water repellent agent adhering to the surface of the hydrophilic layer for hydrophilicity recovery. Therefore, a test of trying to remove a water repellent agent adhering to a surface of a hydrophilic layer 18 in a hydrophilic member 20 according to this invention with various treatment methods was conducted. In this test, a plurality of samples of the hydrophilic member 20 with a film thickness of $SiO_2$ forming the intermediate layer 22 set to 10 nm and a film thickness of $Al_2O_3$ forming the hydrophilic layer 18 set to 13 nm were fabricated, and each sample was immersed in a water repellent liquid obtained by 25-fold dilution of a water repellent agent ("ENEOS D Water Repellent Coat"+ "ENEOS D Protection Coat" manufactured by JX Nippon Oil & Energy Trading Corporation) with tap water. Each sample was removed from the water repellent liquid and dried naturally for five minutes, and then, an attempt to remove the water repellent agent adhered to the surfaces of the hydrophilic layers 18 in the respective samples was made by various treatment methods A to E below.
(Treatment Methods)
A: Washing the surface of the hydrophilic layer 18 only with water (for reference).
B: Rubbing the surface of the hydrophilic layer 18 with a polyester sponge under running water.
C. Rubbing the surface of the hydrophilic layer 18 with a polyurethane sponge under running water.
D: Rubbing the surface of the hydrophilic layer 18 with a polyurethane sponge with an aqueous solution of sodium bicarbonate absorbed therein.
E: Rubbing the surface of the hydrophilic layer 18 with a silica-based polishing agent.

Figure 11:
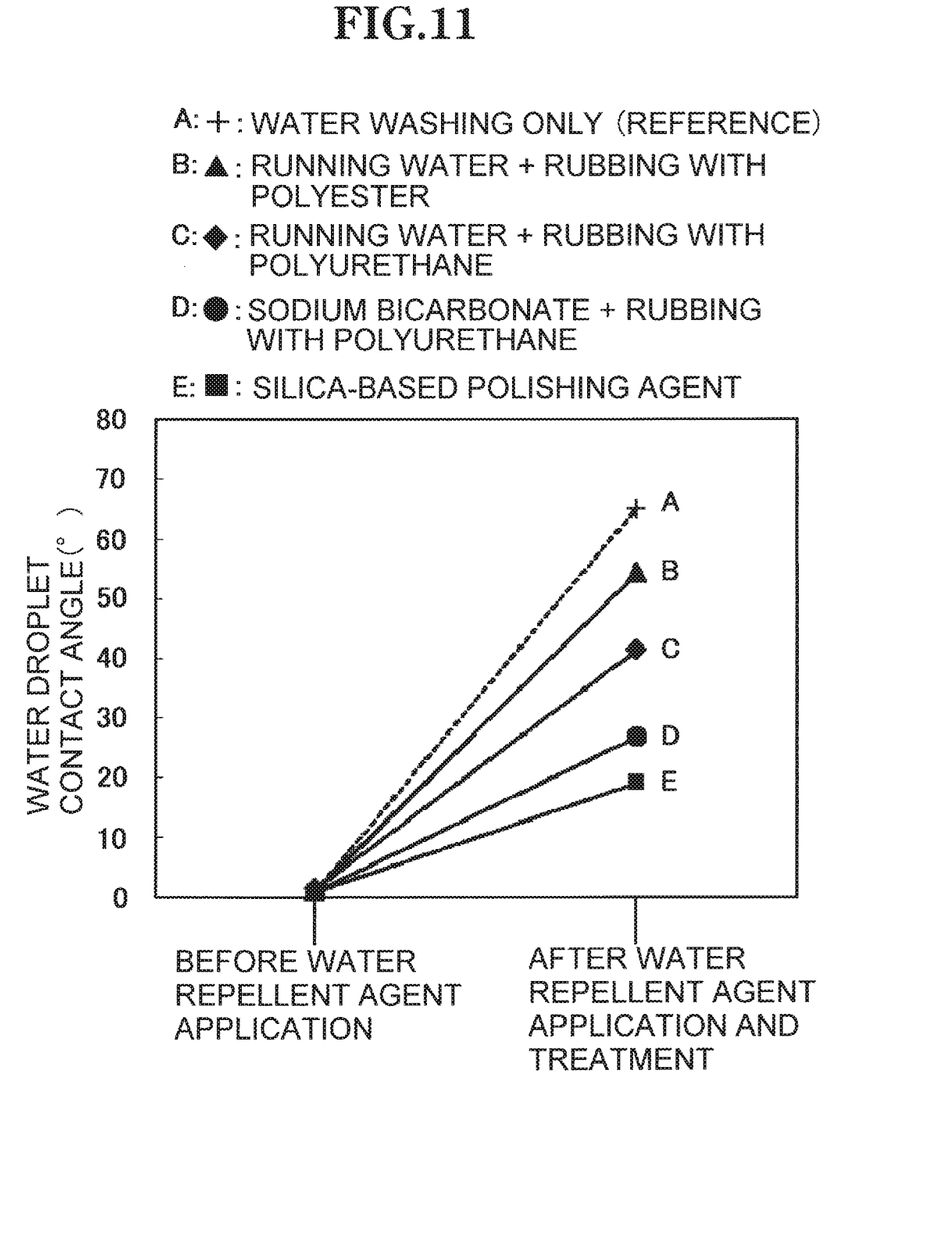
FIG. 11 is a graph indicating results of a comparison test of water repellent agent removal effects depending on various maintenance methods in the hydrophilic member according to the example.

After the treatment, each sample was dried naturally and a water droplet contact angle was measured. FIG. 11 indicates results of the measurement. According to the results, treatment method E exerted a highest water repellent agent removal effect, but silica (silicon oxide) has a Mohs hardness of 6.5 to 7, which is high, and thus may damage the surface of the hydrophilic layer 18. Treatment method D exerted a highest water repellent agent removal effect next to treatment method E. Presumably, this is because sodium bicarbonate is dissolved in water, hydrogen carbonate ions are thereby produced and the hydrogen carbonate ions chemically adsorb the water repellent agent having a cation property, the water repellent agent adhering to the surface of the hydrophilic layer 18, and effectively take the water repellent agent off from the surface of the hydrophilic layer 18. Therefore, from among treatment methods A to F, treatment method D can be considered most preferable. Here, it is conceivable that sodium bicarbonate can be expected to exert a water repellent agent removal effect also when sodium bicarbonate is used with sodium bicarbonate powder remained therein (sodium bicarbonate powder remained in the aqueous solution of sodium bicarbonate or sodium bicarbonate kneaded with water into a paste) other than when used as an aqueous solution of sodium bicarbonate used in treatment method D above. If the surface of the hydrophilic layer 18 is rubbed in a state in which sodium bicarbonate powder remains, an effect of physically removing the water repellent agent by means of polishing can also be expected. Even if sodium bicarbonate powder remains, a Mohs hardness of sodium bicarbonate is 2.5, which is low, and thus is much less likely to damage the hydrophilic layer 18 of $Al_2O_3$ having a Mohs hardness of 9, which is very high. Also, although a polyurethane sponge was used in treatment method D above, it is conceivable that a water repellent agent removal effect can be expected using a combination of sodium bicarbonate and another material (for example, a polyester sponge).

Figure 12:
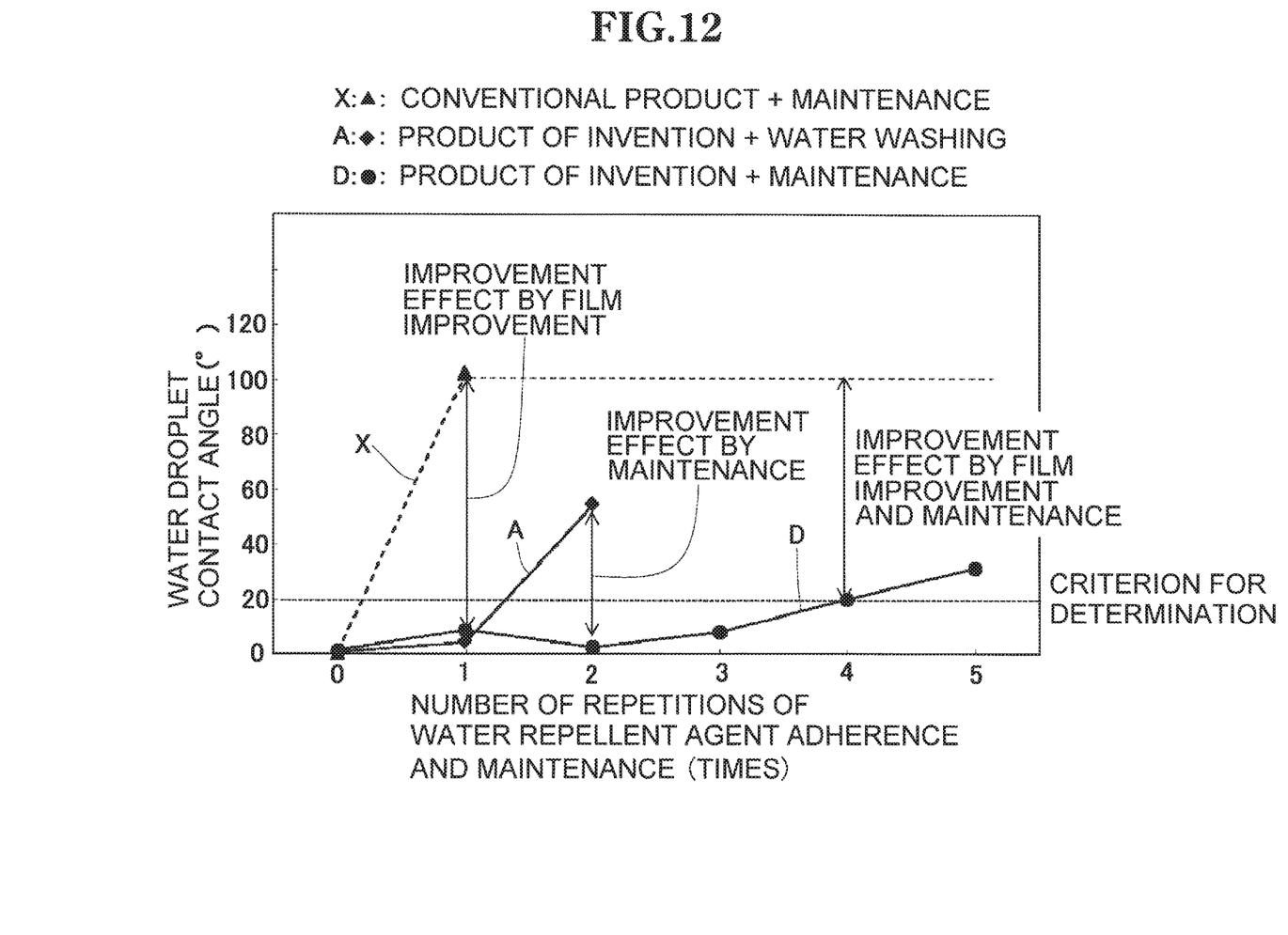
FIG. 12 is a graph indicating results of a comparison test of a photocatalytic performance recovery effect by a maintenance, the test being conducted using the hydrophilic members according to the example and the reference example.

A test of a photocatalytic performance recovery effect where adherence of a water repellent agent was repeated and water repellent agent removal treatment was performed by treatment method D each time. In this test, as a sample of the hydrophilic member 20 according to this invention, a sample having a structure that is the same as those used in the test in FIG. 11 (film thickness of $SiO_2$ forming the intermediate layer 22 set to 10 nm and a film thickness of $Al_2O_3$ forming the hydrophilic layer 18 set to 13 nm) was used. In the test, the sample was immersed in a water repellent liquid obtained by 25-fold dilution of a water repellent agent ("ENEOS D Water Repellent Coat"+"ENEOS D Protection Coat" manufactured by JX Nippon Oil & Energy Trading Corporation) with tap water. The sample was removed from the water repellent liquid and dried naturally for five minutes, and then a surface of the hydrophilic layer 18 was scrubbed with a polyurethane sponge with an aqueous solution of sodium bicarbonate absorbed therein. Subsequently, tap water was poured over the surface of the hydrophilic layer 18 to rinse sodium bicarbonate off, and the sample was dried naturally and then the surface of the hydrophilic layer 18 of the sample was continuously irradiated with ultraviolet light having an intensity of 1.0 $mW/cm^2$ using a black light, and a water droplet contact angle was measured after five hours from a start of the irradiation. With the above as one test, this test was repeated. A result of the test is indicated by characteristic line D in FIG. 12. In FIG. 12, characteristic line X indicates a result of the test being conducted once using a sample of the hydrophilic member 10 according to the reference example in FIG. 2 (the hydrophilic layer 18 is formed of $SiO_2$ and has a film thickness of 20 nm). Also, characteristic line A indicates a result of the test being conducted twice using another sample having a structure that is identical to that of the sample of the hydrophilic member 20 according to this invention, which provides characteristic line D, by treatment method A (only water washing) instead of treatment method D. If a reference water droplet contact angle for determining that photocatalytic performance has recovered is 20 degrees, characteristic line X indicates that even if the hydrophilic member 10 according to the reference example is subjected to treatment by treatment method D, the water repellent agent is not removed and thus hydrophilicity cannot be recovered by means of a photocatalytic action caused by five-hour ultraviolet light irradiation. Also, characteristic line A indicates that if the hydrophilic member 20 according to this invention is treated by water washing only, photocatalytic performance can be recovered after first water repellent agent adherence but hydrophilicity cannot be recovered after second water repellent agent adherence by means of a photocatalytic action caused by five-hour ultraviolet light irradiation. On the other hand, characteristic line D indicates that if the hydrophilic member 20 according to this invention is treated by treatment method D, hydrophilic performance can be recovered after four-time water repellent agent adherences.

Although in the above-described embodiment, the intermediate layer is formed using $SiO_2$, the intermediate layer can also be formed using a material, other than $SiO_2$, that enables a hydrophilic layer to be formed so as to have a low density compared to a case where a hydrophilic layer is formed directly on a photocatalytic layer where these hydrophilic layers 18 are formed under same film forming conditions. Also, although in the above-described embodiment, the intermediate layer is formed using a single material, but can be formed using a material that is a composite of a plurality of materials.

Although in the above-described embodiment, the hydrophilic layer is formed using $Al_2O_3$, the hydrophilic layer can be formed using a hydrophilic material, other than $Al_2O_3$, that has an isoelectric point exceeding 7 and is formed so as to have a low density as a result of provision of an intermediate layer compared to a case where a hydrophilic layer is formed directly on a photocatalytic layer where these hydrophilic layers 18 are formed under same film forming conditions. For example, NiO has an isoelectric point of 10.3, which is high, has relatively-favorable hydrophilicity and favorable scratch resistance (Mohs hardness of 5.5 to 6) and water insolubility, and may be able to be used as a material of the hydrophilic layer according to this invention. As conditions for vapor deposition of NiO for forming a film of NiO by a vacuum vapor deposition method to form a hydrophilic layer, for example the conditions indicated in FIG. 3 can be used. Also, although in the above-described embodiment, the hydrophilic layer is formed using a single material, the hydrophilic layer can be formed using a material that is a composite of a plurality of materials. In other words, the hydrophilic layer can be formed using a composite material prepared so as to have an isoelectric point exceeding 7 and provides hydrophilicity, as the entire composite material.

Although in the above-described embodiment, the photocatalytic layer is formed using $TiO_2$, the photocatalytic layer can also be formed using a photocatalytic material other than $TiO_2$. Also, although in the above-described embodiment, the photocatalytic layer is formed using a single material, the photocatalytic layer can also be formed using a material that is a composite of a plurality of materials. In other words, the photocatalytic layer can be formed using a composite material that provides a photocatalytic action as the entire composite material.

Although in the above-described embodiment, the photocatalytic layer, the intermediate layer and the hydrophilic layer are each formed by a vacuum vapor deposition method, the photocatalytic layer, the intermediate layer and the hydrophilic layer can also be formed by another PVD method (for example, sputtering) or a thin film forming method other than the PVD methods.

Although the above embodiment has been described in terms of a case where this invention is applied to a hydrophilic mirror for a vehicle outer mirror, this invention is applicable also to a hydrophilic mirror other than an outer mirror for a vehicle and further to a hydrophilic member other than the mirrors (for example, a hydrophilic window glass for a vehicle).

The invention claimed is:

1. A hydrophilic member including a photocatalytic layer disposed on a base material and a hydrophilic layer disposed on the photocatalytic layer, wherein:
   an isoelectric point of the hydrophilic layer has a value exceeding 7; and
   a layer is disposed as an intermediate layer between the photocatalytic layer and the hydrophilic layer.

2. The hydrophilic member according to claim 1, wherein the intermediate layer consists essentially of $SiO_2$.

3. The hydrophilic member according to claim 2, wherein a film thickness of the intermediate layer is 5 to 15 nm.

4. The hydrophilic member according to claim 1, wherein the hydrophilic layer consists essentially of $Al_2O_3$.

5. The hydrophilic member according to claim 4, wherein the film thickness of the hydrophilic layer is 5 to 13 nm.

6. The hydrophilic member according to claim 1, wherein the photocatalytic layer consists essentially of $TiO_2$.

7. A hydrophilic member manufacturing method comprising:
   forming a photocatalytic layer on a base material;
   forming an intermediate layer on the photocatalytic layer; and
   forming a hydrophilic layer having an isoelectric point exceeding 7 on the intermediate layer.

8. The hydrophilic member manufacturing method according to claim 7, wherein:
   each of the photocatalytic layer, the intermediate layer and the hydrophilic layer is formed by a physical vapor deposition method; and
   a temperature of the base material when the hydrophilic layer or the intermediate layer is formed is lower than the temperature of the base material when the photocatalytic layer is formed.

9. A hydrophilic member maintenance method comprising performing water repellent agent removal treatment of a surface of the hydrophilic layer of a hydrophilic member according to claim 1, hydrophilicity of the surface being lowered by adherence of a water repellent agent, using sodium bicarbonate to recover the hydrophilicity of the surface of the hydrophilic layer.

10. The maintenance method according to claim 9, wherein the water repellent agent removal treatment is performed by rubbing the surface of the hydrophilic layer with a sponge with sodium bicarbonate and water absorbed therein.

11. The hydrophilic member according to claim 1, wherein the hydrophilic layer is porous.

12. The hydrophilic member according to claim 7, wherein the hydrophilic layer is porous.

* * * * *